(12) United States Patent
Vambenepe et al.

(10) Patent No.: US 7,984,128 B2
(45) Date of Patent: Jul. 19, 2011

(54) SYSTEM AND METHOD FOR DISCOVERING MANAGED INFORMATION TECHNOLOGY RESOURCES

(75) Inventors: Guillaume N. Vambenepe, Mountain View, CA (US); Nicolas Catania, Palo Alto, CA (US); Bryan P. Murray, Duvall, WA (US); M. Homayoun Pourheidari, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1652 days.

(21) Appl. No.: 10/445,236

(22) Filed: May 23, 2003

(65) Prior Publication Data
US 2004/0237094 A1 Nov. 25, 2004

(51) Int. Cl.
*G06F 15/173* (2006.01)
(52) U.S. Cl. .......................... 709/223; 719/316
(58) Field of Classification Search ................. 709/223; 719/316
See application file for complete search history.

(56) References Cited

U.S. PATENT DOCUMENTS

| | | | | |
|---|---|---|---|---|
| 6,157,953 | A * | 12/2000 | Chang et al. | 709/225 |
| 6,363,421 | B2 * | 3/2002 | Barker et al. | 709/223 |
| 6,466,973 | B2 * | 10/2002 | Jaffe | 709/223 |
| 6,862,736 | B2 * | 3/2005 | Hudis et al. | 719/316 |
| 6,978,422 | B1 * | 12/2005 | Bushe et al. | 715/734 |
| 6,996,778 | B2 * | 2/2006 | Rajarajan et al. | 715/734 |
| 7,032,021 | B1 * | 4/2006 | Froeschl et al. | 709/224 |
| 7,047,243 | B2 * | 5/2006 | Cabrera et al. | 707/10 |
| 7,099,931 | B2 * | 8/2006 | Da Palma et al. | 709/220 |
| 7,133,908 | B1 * | 11/2006 | Pajak et al. | 709/223 |
| 7,159,224 | B2 * | 1/2007 | Sharma et al. | 719/310 |
| 7,185,192 | B1 * | 2/2007 | Kahn | 713/155 |
| 7,206,843 | B1 * | 4/2007 | Allavarpu et al. | 709/226 |
| 7,584,278 | B2 * | 9/2009 | Rajarajan et al. | 709/226 |
| 7,869,425 | B2 * | 1/2011 | Elliott et al. | 370/352 |
| 2002/0143949 | A1 * | 10/2002 | Rajarajan et al. | 709/226 |

* cited by examiner

*Primary Examiner* — Douglas B Blair

(57) ABSTRACT

A system for managing an information technology (IT) resource comprises a managed object that represents the resource. At least one management interface is associated with the managed object. The management interface is configured with at least one component that represents a management feature for the resource. An attribute associated with the at least one component in the management interface indicates the presence of the management feature to a manager. The system provides a common, consistent facility for accessing management features of resources represented by a managed object configured with one or more management interfaces. The management interfaces allow manager to access information to monitor, audit, and control various aspects of the resources. Managers can also use information in the management interfaces to determine management attributes and relationships among related managed objects.

12 Claims, 13 Drawing Sheets

SYSTEM AND METHOD FOR DISCOVERING MANAGED INFORMATION TECHNOLOGY RESOURCES

COMPUTER PROGRAM LISTING APPENDIX

This specification includes Appendix A (consisting of five text files) on CD-ROM, which contains interface description documents that can be used with some embodiments of the invention. Appendix A is incorporated herein by reference.

BACKGROUND

Today, information technology (IT) resources are managed using a variety of incompatible and often proprietary interfaces and protocols. Requirements for management information regarding the resources need to be specifically programmed to address new resources and in many cases the specific programming is not updated as new versions of the IT resources become available.

The problem of managing disparate IT resources is becoming more acute as systems are increasingly developed using IT resources that are deployed in remote locations and accessed via information networks, such as the Internet. Generally, the resources to be managed are not readily identifiable when the resources are highly distributed and independent of one another. Further, it is difficult to obtain information regarding properties and attributes of the resources, and protocols for exchanging management information with the resources. A further difficulty lies in determining the relationships among the resources used in a system to pinpoint operational problems when one or more of the resources do not respond as expected.

The term Web services, also referred to herein as "services", describes an approach to distributed computing in which interactions are carried out through the exchange of eXtensible Markup Language (XML) messages. Web services can perform any task that can be described and contained within one or more modules of code. Essentially any transaction or bit of business logic can become a Web service if it can be accessed and used by another system over the Internet.

A Web service is a software system identified by a Universal Resource Identifier (URI) whose public interfaces and bindings are typically defined and described in an XML document. The description can be discovered by other software systems. These systems may then interact with the Web service in a manner prescribed by its definition, using XML based messages conveyed by Internet protocols.

The Web services architecture is based upon the interactions between three primary roles: service provider, service registry, and service requester. These roles interact using publish, find and bind operations. The service provider is the entity that provides access to the Web service and publishes the service description in a service registry. The service requester finds the service description in a service registry and can use the information in the description to bind to a service.

Web services typically send XML messages formatted in accordance with the Simple Object Access Protocol (SOAP) specification. The SOAP specification is a universally agreed-upon protocol that can use XML and HTTP together to invoke functions exposed in Web services.

The XML messages are described using the Web Services Description Language (WSDL) specification, which, along with the Universal Description Discovery and Integration (UDDI) registry, provides a definition of the interface to a Web service and identifies service providers in a network. The WSDL specification is an XML-based language used to define Web services and describe how to access them. An application trying to use a particular Web Service can often use WSDL to find the location of the Web service, the function calls available, and the format that must be followed to access the Web service. Therefore, the client first obtains a copy of the WSDL file from the server and then uses the information in this file to format a SOAP request.

The UDDI registry supports Web services by providing a place for a company to register its business and the Web services that it offers. Users that need a Web service can use this registry to find a business that provides the service.

It is not uncommon for systems that manage IT resources to be responsible for monitoring and/or controlling hundreds or even thousands of resources. Current systems do not provide a common, consistent facility for accessing management features of the IT resources. Further, the systems do not include facility to allow a manager to dynamically discover resources that can be managed and the management features that are available for a particular resource. Current systems also do not provide facilities for determining resources that are related to a discovered resource, and whether or not the related resources can also be managed.

SUMMARY

In one embodiment, a system for managing an information technology (IT) resource comprises a managed object that represents the resource. At least one management interface is associated with the managed object. The management interface is configured with at least one component that represents a management feature for the resource. An attribute associated with the at least one component in the management interface indicates the presence of the management feature to a manager.

In another embodiment, a method for managing a plurality of IT resources comprises invoking an identity interface in a managed object. The managed object represents one of the plurality of resources. The method further comprises determining an identifier for an interface description via the identity interface, and accessing the interface description to determine management features available for the one of the plurality of resources.

In a further embodiment, a computer product comprises a managed object executable on a computer processor. A management interface associated with the managed object represents a management feature available for a resource. An attribute associated with the management interface indicates to a manager that the management interface represents the management feature.

Various other features of embodiments of the invention will be more fully understood upon consideration of the detailed description below, taken together with the accompanying figures.

DETAILED DESCRIPTION OF THE FIGURES

Figure 1A:
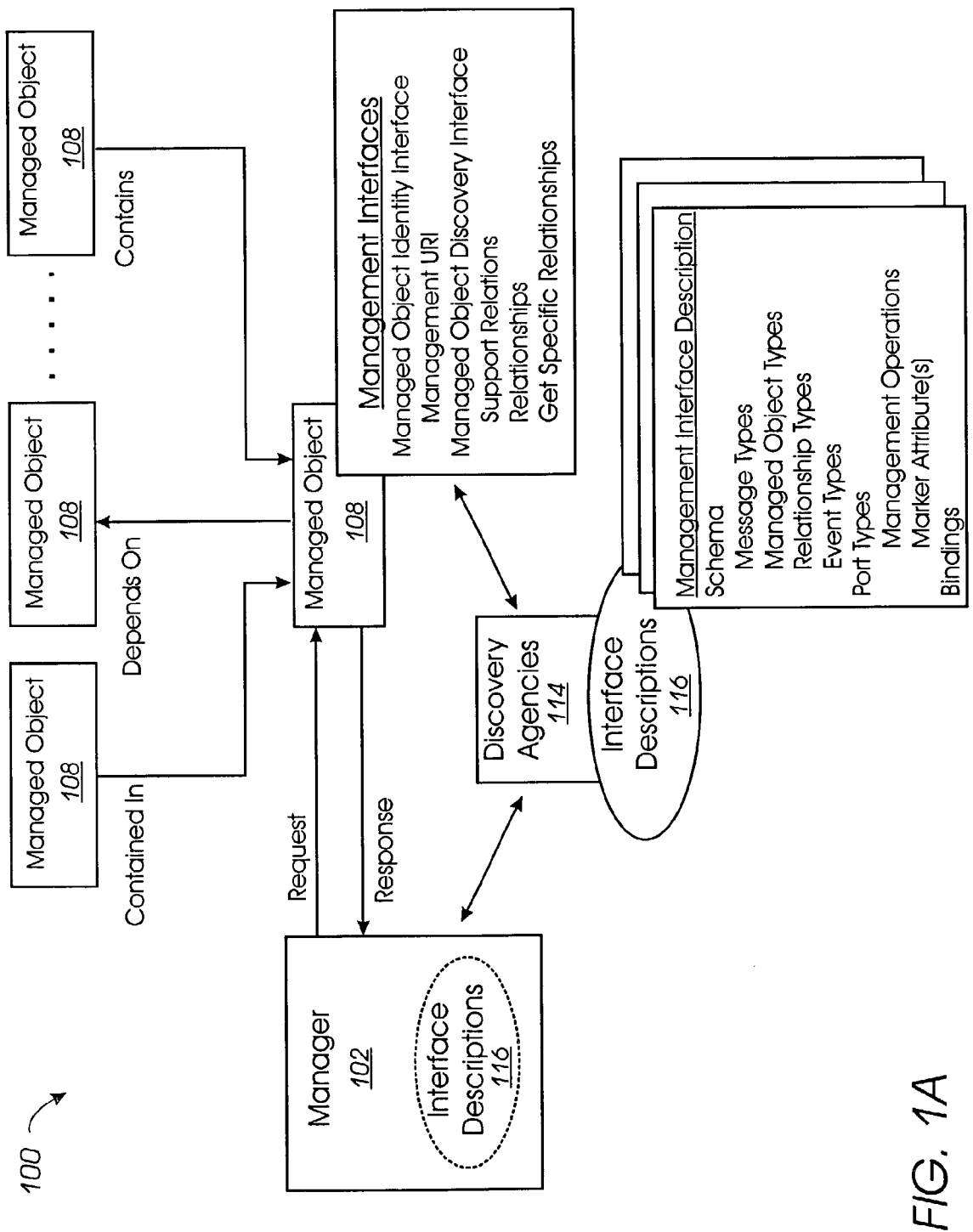
FIG. 1A is a diagram of components included in an embodiment of an information technology (IT) resource management system.
Figure 1B:
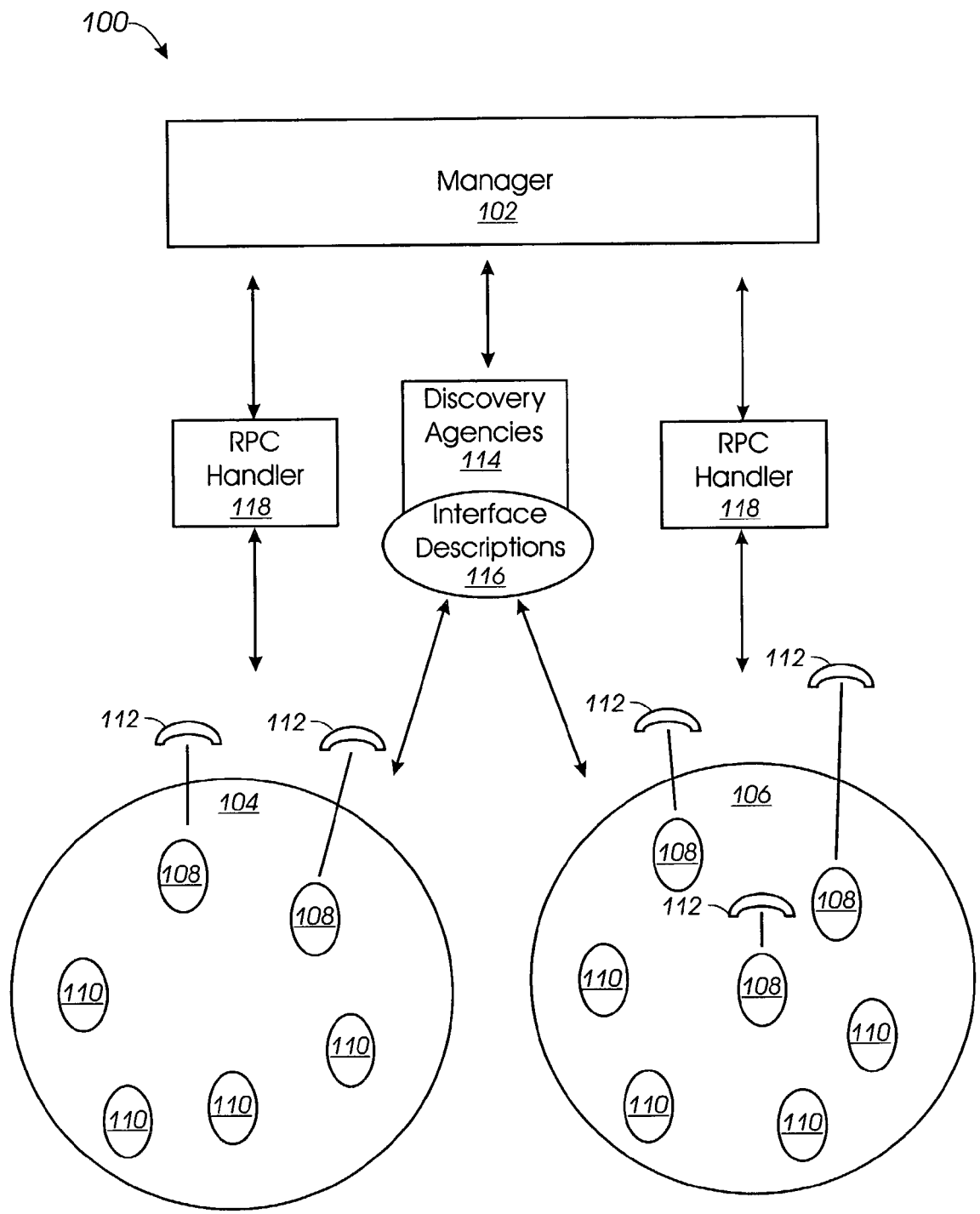
FIG. 1B is a diagram showing additional components included in an embodiment of the information technology (IT) resource management system of FIG. 1A.

Referring to FIGS. 1A and 1B, an embodiment of a management system 100 that allows manager 102 to discover managed information technology (IT) resources in one or more domains 104, 106 is shown. The resources can be any type of software, hardware, and/or firmware that is configured to interface with manager 102. Resources that are configured to be managed by manager 102 are represented as managed objects 108. Resources that are not configured to interface with manager 102 are represented by unmanaged objects 110.

Management system 100 includes features that provide a common, consistent facility for accessing management features of managed objects 108. Management system 100 can utilize one or more discovery mechanisms to discover management interfaces 112 of managed objects 108. Management interfaces 112 allow manager 102 to access information to monitor, audit, and control various aspects of resources represented by managed objects 108. Manager 102 can also use information in management interfaces 112 to determine management attributes, operations, and relationships among related managed objects 108.

Various implementations of management interfaces 112 can hide selected management capabilities from managers 102 that are not authorized to access the selected management capabilities. Each managed object 108 can also utilize one or more additional extended interfaces that expose relevant information to manager 102. The extended interfaces can be implemented as needed based on the type of resource to be managed.

In some embodiments, manager 102 and managed objects 108 can communicate with one or more discovery agencies 114 to access interface descriptions 116 for management interfaces 112. Interface descriptions 116 can be configured to expose some or all of the management features that are available through a particular one of management interfaces 112 to manager 102.

Interface descriptions 116 provide a common framework for exposing management services for all managed objects 108 regardless of the resources they represent. Management interfaces 112 can be implemented in various languages and formats. Interface descriptions 116 define management features available through management interfaces 112 in a common format that can be used by other managed objects 108 and manager 102. In some embodiments, interface descriptions 116 define management interfaces 112 in Web Services Description Language (WSDL), and messages between manager 102 and managed objects 108 can be exchanged via the Simple Object Access Protocol (SOAP) protocol. Other suitable formats and protocols can be utilized.

Managed objects 108 can themselves be utilized as Web services by manager 102. Remote procedure call (RPC) handler 118 can be implemented to transmit and receive request and response messages between manager 102 and managed objects 108. Message(s) pass inbound from manager 102 to one or more of managed objects 108 and contain the method identifier and any input parameters. The information in the message is used to map to a method call in the appropriate native programming language for the underlying resource, and to execute the method with the supplied input parameters. After the method executes, another message passes outbound from managed object(s) 108 to manager 102 and contains the method identifier, the result of executing the method, and any output parameters (or exception information in the case of an error). Any suitable programming language, application program interface, procedure call facilities and protocols can be utilized to implement RPC handler 118, such as JAX-RPC and SOAP. RPC handlers 118 can be deployed as part of managed objects 108, or provided independently on a platform that can access the corresponding managed objects 108.

Discovery Mechanisms

Management system 100 can utilize a discovery mechanism to discover management interfaces 112 of managed object 108.

Figure 2:
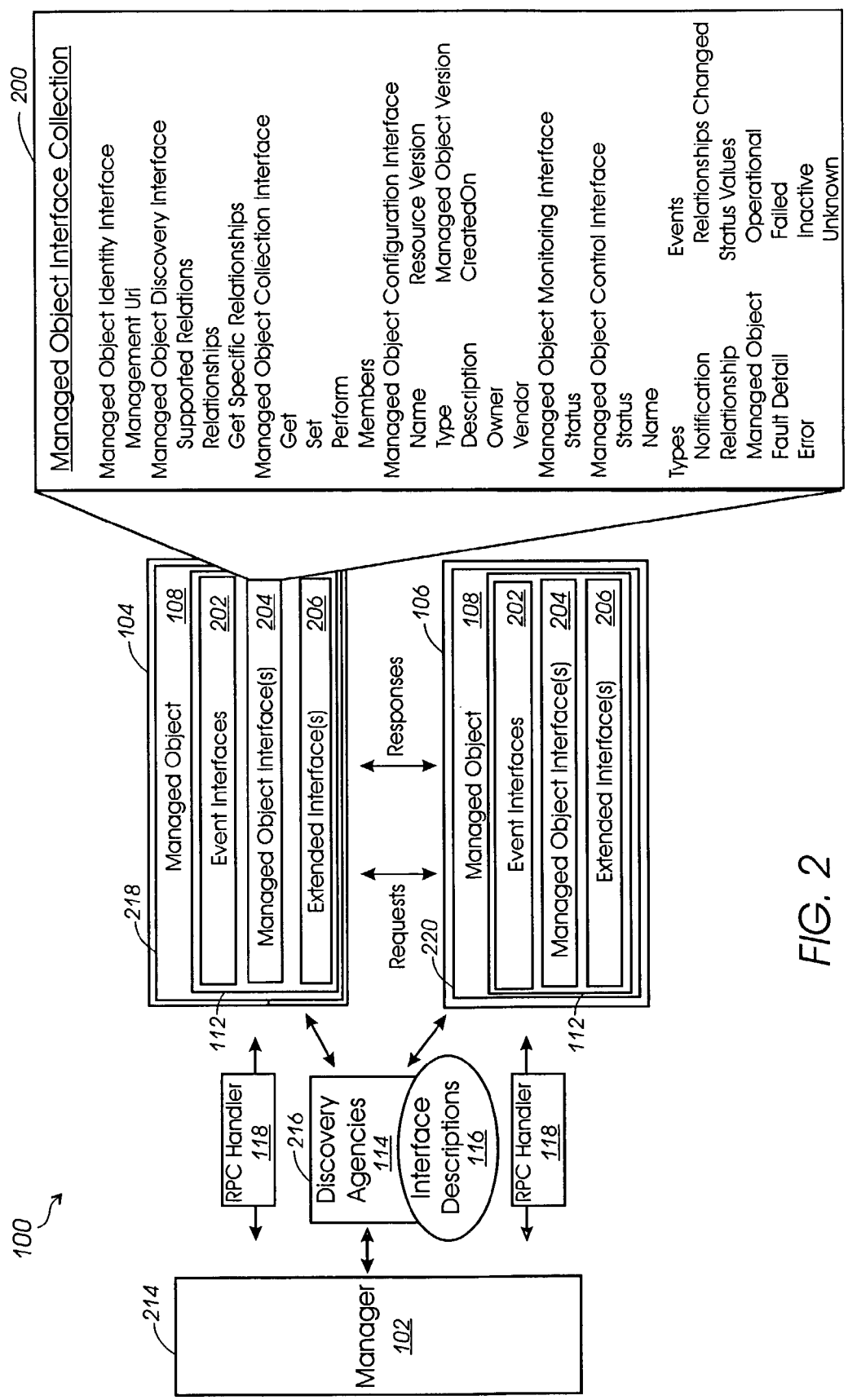
FIG. 2 is a diagram showing further detail of an embodiment of a portion of the management interfaces of FIG. 1B.

Referring now to FIG. 2, in some embodiments, management interfaces 112 include event interfaces 202, managed object interfaces 204, and extended interfaces 206. Mangement interfaces 112 typically include attributes that represent information about managed objects 108; operations to support the management of managed objects 108; and/or events representing exceptions and state changes that can be reported by managed objects 108 to manager 102.

In some embodiments, each collection of management interfaces 112 supports one or more categories of management capabilities such as monitoring, discovery, control, performance, configuration, and security. Additional or fewer categories can be utilized. Further, other management interfaces 112 that support additional or different management capabilities can be utilized, in addition to, or instead of, event interfaces 202, managed object interfaces 204, and extended interfaces 206.

Each interface description 116 can include information regarding all management interfaces 112 for a particular managed object 108. Additionally, programming language features such as import and include statements, can be utilized to form a complete interface description 116 of all management interfaces 112 utilized by a particular managed object 108.

In some embodiments of interface descriptions 116, such as interface descriptions 116 implemented in WSDL, features such as schemas, port types, marker attributes, and namespaces can be utilized. Port types can describe a list of potential management capabilities for manager 102. Ports that implement some or all of the port types defined in interface descriptions 116 allow managed objects 108 to expose their management capabilities and provide manager 102 with instructions for using the management capabilities.

Managed objects 108 can expose different portions of management interfaces 112 to different managers 102. Port types can describe a list of potential management capabilities for Manager 102. By making ports available that implement some or all of the port types defined in corresponding interface descriptions 116, managed objects 108 can expose their management capabilities and provide manager 102 with instructions to use the management capabilities.

Managed object 108 is not required to expose the same management interfaces 112 to all callers. It is anticipated that many managed objects 108 will expose different features in management interfaces 112 to different requesters, such as:

limiting anonymous managers 102 to only query basic information;

allowing recognized managers 102 to also query performance information; and allowing trusted managers 102 (e.g., administrators) access to all features in management interfaces 112.

Managed objects 108 can implement selected management port types. Management port types can be derived from management interfaces 112 as follows:

a) A specific namespace corresponds to each Interface Collection, such as Managed Object Interface Collection 200.

b) Inside each Interface Collection, all attributes, operations and notifications are assigned an interface.

c) For each Interface Collection:
   i) for each attribute with read (R) access, a get operation can be created that takes an empty input message and returns the attribute;
   ii) for each attribute with write (W) access, a set operation can be created that takes the attribute and returns an empty input message;
   iii) for each operation in an Interface Collection, a corresponding operation can be created in interface descriptions 116.

In some embodiments, a marker attribute can be added to the port types to indicate to manager 102 that the port types are management port types.

Interfaces shown in the embodiment of Managed Object Interface Collection 200 of FIG. 2 include Managed Object Identity Interface, Managed Object Discovery Interface, Managed Object Collection Interface, Managed Object Configuration Interface, Managed Object Monitoring Interface, and Managed Object Control Interface.

Managed objects 108 can implement Managed Object Identity Interface, which includes a Management URI attribute. Management URI represents an identifier, such as a URI, that points to interface descriptions 116 of Managed Object Interfaces Collection 200. In some embodiments, Management URI points to a WSDL document that includes at least one port that refers to a binding for a port type. The port type can be marked with a marker attribute indicating that the port corresponds to a management interface. For example, a WSDL document for an interface description 116 to describe Managed Object Identity Interface can include:

```
<!-- Define Managed Object Identity Interface including types, messages
exchanged with requesting entity, port type for the management
interface, and binding between port type and management interface. -->
<definitions
    <types>
        <s:schema targetNamespace="http://Foundation"
            elementFormDefault="qualified">
            <s:include schemaLocation="Foundation.xsd" />
            <s:element name="GetManagementUrl" />
            <s:element name="GetManagementUrlResponse"
                type="tns:ManagedObject" />
        </s:schema>
    </types>
    <message name="GetManagementUrlRequest">
        <part name="document"
            element="tns:GetManagementUrl" />
    </message>
    <portType name="ManagedObjectIdentityPT"
        tns:baseManagementInterface="#base">
        <operation name="GetManagementUrl"
            tns:attributeType="s:anyURI">
            <input message="tns:GetManagementUrlRequest" />
            <output message="tns:GetManagementUrlResponse" />
        </operation>
```

-continued

```
    </portType>
    <binding name="ManagedObjectIdentitySoapHttpBinding"
            type="tns:ManagedObjectIdentityPT">
        <soap:binding transport="http://schemas.xmlsoap.org/
        soap/http"
            style="document" />
        <operation name="GetManagementUrl">
            <soap:operation soapAction=" " style="document" />
            <input><soap:body use="literal" /></input>
            <output><soap:body use="literal" /></output>
        </operation>
    </binding>
</definitions>
```

In the above example, baseManagementInterface is a marker attribute that is used to indicate that the Managed Object Identity port is one of management interfaces 112. In some embodiments, if one of management interfaces 112 depends on the capabilities described in another of management interfaces 112, the marker attribute can list other management interfaces 112 that must be exposed in order to have a complete management view of managed object 108. Additionally, the marker attribute can be used on other features in interface descriptions 116 to indicate that the features form part of the management capabilities for managed object 108.

The GetManagementUrl operation can be invoked by manager 102 to discover other interface descriptions 116 for managed object 108 in addition to the description for the Managed Object Identity Interface. The GetManagementUrlRequest and GetManagementUrlResponse messages can be used to convey the request from manager 102 to managed object 108, and to return the response from managed object 108 to manager 102. In some embodiments, manager 102 can be provided with knowledge of the existence of managed object(s) 108 and the availability of the GetManagementUrl operation.

To further aid manager 102 in discovering management capabilities for a system of related managed objects 108, Managed Object Discovery Interface can include features such as Supported Relations attribute, Relationships attribute, and a Specific Relationships operation. Supported Relations represents an attribute that returns a list of the relations supported by managed object 108. Any of the relations in the list may be used in relationships managed object 108 has with other managed objects. Relationships can represent an attribute that returns a list of relationships with other managed objects 108 that are currently active for managed object 108. The list of relationships can be dynamic and can change as the underlying resource interacts with other resources. Get Specific Relationships (relation) can represent an operation that returns a list of identifiers, such as a URIs, of relationships having a specific relation with another managed object 108. The Get Specific Relationships operation typically returns a subset of the list returned by the Relationships attribute. The following is an example of a WSDL document for an interface description 116 to describe an embodiment of the Managed Object Discovery Interface:

```
<!-- Define Managed Object Discovery Interface including types, messages
exchanged with requesting entity, port type for the management
interface, and binding between port type and management interface. -->
<definitions
    <types>
        <s:schema targetNamespace="http://Foundation"
            elementFormDefault="qualified">
            <s:include schemaLocation="Foundation.xsd" />
            <s:element name="GetSupportedRelations" />
```

```
            <s:element name="GetSupportedRelationsResponse">
                <s:complexType>
                    <s:sequence>
                        <s:element ref="tns:RelationList" />
                    </s:sequence>
                </s:complexType>
            </s:element>
<s:element name="GetRelationships" />
            <s:element name="GetRelationshipsResponse">
                <s:complexType>
                    <s:sequence>
                        <s:element ref="tns:RelationshipList" />
                    </s:sequence>
                </s:complexType>
            </s:element>
            <s:element name="GetSpecificRelationships">
                <s:complexType>
                    <s:sequence>
                        <s:element name="Relation" type="s:anyURI" />
                    </s:sequence>
                </s:complexType>
            </s:element>
            <s:element name="GetSpecificRelationshipsResponse">
                <s:complexType>
                    <s:sequence>
                        <s:element ref="tns:ManagedObjectList" />
                    </s:sequence>
                </s:complexType>
            </s:element>
    <message name="GetSupportedRelationsRequest">
        <part name="document" element=
        "tns:GetSupportedRelations" />
    </message>
    <message name="GetSupportedRelationsResponse">
        <part name="document"element=
                        "tns:GetSupportedRelationsResponse" />
    </message>
    <message name="GetRelationshipsRequest">
        <part name="document" element="tns:GetRelationships" />
    </message>
    <message name="GetRelationshipsResponse">
        <part name="document" element=
        "tns:GetRelationshipsResponse"
/>
    </message>
    <message name="GetSpecificRelationshipsRequest">
        <part name="document" element=
        "tns:GetSpecificRelationships"
/>
    </message>
    <message name="GetSpecificRelationshipsResponse">
            <part name="document"
element="tns:GetSpecificRelationshipsResponse" />
    </message>
    <portType name="ManagedObjectDiscoveryPT"
        tns:baseManagementInterface="#base">
        <operation name="GetSupportedRelations"
                tns:attributeType="tns:ReltationListDefinition">
            <input message="tns:GetSupportedRelationsRequest" />
            <output message="tns:GetSupportedRelationsResponse" />
        </operation>
    </portType>
        <operation name="GetRelationships"
            tns:attributeType="tns:RelationshipListDefinition">
            <input message="tns:GetRelationshipsRequest" />
            <output message="tns:GetRelationshipsResponse" />
        </operation>
        <operation name="GetSpecificRelationships">
            <input message="tns:GetSpecificRelationshipsRequest" />
            <output message=
            "tns:GetSpecificRelationshipsResponse" />
        </operation>
    </portType>
    <binding name="ManagedObjectDiscoverySoapHttpBinding"
        type="tns:ManagedObjectDiscoveryPT">
        <soap:binding transport=
        "http://schemas.xmlsoap.org/soap/http"
            style="document" />
        <operation name="GetSupportedRelations">
            <soap:operation soapAction="" style="document" />
                <input><soap:body use="literal" /></input>
                <output><soap:body use="literal" /></output>
            </operation>
        <operation name="GetRelationships">
            <soap:operation soapAction="" style="document" />
                <input><soap:body use="literal" /></input>
                <output><soap:body use="literal" /></output>
            </operation>
        <operation name="GetSpecificRelationships">
            <soap:operation soapAction=" " style="document" />
                <input><soap:body use="literal" /></input>
                <output><soap:body use="literal" /></output>
            </operation>
        </binding>
</definitions>
```

The types of relationships that are supported by a particular implementation of managed object 108 can be discovered by manager 102 via the Supported Relations operation that returns a list of the relations supported by managed object 108. Any of the relations in the list may be used in relationships managed object 108 has with other managed objects.

For example, to manage Web services, managed object 108 can support relations such as Contains, Contained In, Depends On, Depended Upon, and Corresponds To. A containing managed object can use the Contains relation to indicate its relationship with a managed object it contains. A managed object 108 contained by another managed object 108 can use the Contained In relation to indicate its relationship with the managed object 108 that contains it. A managed object 108 that depends on another managed object 108 can use the Depends On relation to indicate its relation with the managed object 108 on which it depends. A managed object 108 that can be depended upon by another managed object 108 can use the Depended Upon relation to indicate its relationship with the dependent objects. A managed object 108 can use the Corresponds To relation to indicate a peer relationship with another managed object 108. Other suitable relations can be utilized. Manager 102 can use the Get Relationships operation to discover the managed objects 108 that are linked to a certain managed object 108 by relationships.

Once the relationships of a particular managed object 108 to other managed objects 108 have been discovered, manager 102 can invoke the Get Management URI operation for managed objects 108 returned by the Get Relationships operation to discover interface descriptions 116 for related managed objects 108. In this manner, manager 102 can generate a topology for the related managed objects 108. Manager 102 can use the topology to perform management functions such as monitoring the performance of a system composed of related managed objects 108, and determining the source of problems when fault messages are received.

Other suitable discovery methods can be utilized with management system 100, in addition to, or instead of, the features of Managed Object Identity Interface and Managed Object Discovery Interface discussed herein. For example, managed objects 108 can provide manager 102 with knowledge of corresponding management interfaces 112 when manager 102 invokes managed objects 108.

Regarding other management features that can be provided via managed object interfaces 204, Managed Object Collection Interface can also include Get, Set, Invoke, and Members operations.

Get (select, interface, name) can represent an operation used to query the value of an attribute from members of a collection of managed objects 108. Set (select, interface, name, value) can represent an operation used to modify the value of an attribute on members of a collection of managed objects 108 to the specified value. Invoke (select, interface, name, arguments) can represent an operation used to invoke an operation with the specified arguments on members of a collection of managed objects 108. The management interface and the name of the attribute are specified by the interface and name arguments. The select argument can be an XPath expression that identifies a subset of members of the collection. XPath is a non-XML language used to identify particular parts of XML documents. The return value can be a list of structures that include the value of the specified attribute or fault information that resulted from the query on a particular managed object 108. Other suitable languages can be used in addition to, or instead of, XPath and XML.

Members can represent an attribute that returns a list of the members of the collection of managed objects 108. In some embodiments, the list is a subset of the list of managed objects 108 returned from a Relationships Operation further described herein. Manager 102 can invoke the Relationships Operation to determine all of the managed objects 108 related to a particular managed object 108. Once manager 102 determines the relationships and configuration of related managed objects 108, manager 102 can group managed objects 108 into various "collections" for purposes of streamlining requests to and responses from two or more managed objects 108 using the operations in Managed Object Collection Interface, as well as other facilities that can be included in management system 100.

Managed Object Configuration Interface can include components such as attributes regarding the configuration of associated managed object 108, for example, Name, Type, Description, Owner, Vendor, Resource Version, Managed Object Version, and Created On.

Name can represent an attribute that returns the name of managed object 108. Name can be a read-write attribute, and the write portion can be handled in another interface, such as the Managed Object Control Interface, as further described herein.

Type can represent an attribute that returns the type of managed object 108. The types that are available will depend on the domain and the resources being managed. For example, to manage Web services, types such as Web service, Web service execution environment, and Conversation can be utilized in some embodiments.

Description can represent an attribute that returns a description of managed object 108. Manager 102 can present the description when a user requests more information regarding a particular managed object 108. The information is typically distinct from interface descriptions 116.

Owner can represent an attribute that returns the owner of managed object 108. The owner can be the entity that deployed the resources underlying managed object 108. For instance, if a company has developed and deployed a resource that can be hosted on a third-party system, the company still owns the associated managed object 108. In addition, if a company has purchased the rights to use and deploy a resource locally, the company owns the resource.

Vendor can represent an attribute that returns the vendor originating managed object 108.

Resource Version can represent an attribute that returns the version of the underlying resource.

Managed Object Version can represent an attribute that returns the version of managed object 108.

Created On can represent an attribute that returns the date and time managed object 108 was created.

Managed Object Monitoring Interface can include a Status attribute, which can represent an attribute that returns the status of managed object 108. The status can be represented as an identifier, such as a URI for a document that includes information regarding the status of the underlying resources. Managed Object Interface Collection 200 defines basic status values, which are supported by all managed objects 108. Other interfaces may define other status values that may be returned by the Status attribute. The read portion of the Status attribute can be in one interface such as the Managed Object Monitoring Interface, and the write portion of the Status attribute can be in another interface such as the Managed Object Control Interface. Handling the read and write portions of the Status attribute in different interfaces allows the owner of managed object 108 to offer read-only access to the status to one manager 102, and read-write access to the status to other managers 102.

Managed Object Control Interface can be used to modify the state of managed object 108. In some embodiments, Access to Managed Object Control Interface can be controlled via interface descriptions 116 to allow only managers 102 with acceptable privileges use Managed Object Control Interface. The embodiment of Managed Object Control Interface shown includes Status and Name attributes, which are similar to the Status and Name attributes in the Managed Object Configuration Interface. Managers 102 with access to Managed Object Control Interface can set the values for the Status and Name attributes, however.

Several types of components can be used in managed object interfaces 204. The embodiment of Managed Object Interface Collection 200 shown in FIG. 2 includes Notification, Relationship, Managed Object, Fault Detail, and Error types that can be implemented in managed object interfaces 204. Attributes in Managed Object Interface Collection 200 can support types of access by other objects, such as read and read/write. When interface descriptions 116 are implemented in WSDL, managed object interfaces 204, 114 can be mapped to ports, and access policies can be mapped to operations on attributes, as further described herein.

Notification type can be used for event notifications that can be sent to manager 102. Relationship type can describe a relationship between two or more managed objects 108. Managed Object can be a simple type based on the XML schema anyURI type and points to interface descriptions 116 for a particular managed object. An element of FaultDetail type can be added to the fault detail element of all SOAP faults returned by managed object interfaces 204, and other interfaces associated with particular types of managed objects 108. Error type can describe an error. The Fault Detail element type can include one or more of the Error type elements to offer more specific information about the error.

The embodiment of Managed Object Interface Collection 200 shown also includes Status values and Events. For example, the type Relationships Changed Event can indicate an update to relationships in managed object 108. Relationships Changed Event can occur when a new relationship is added or when a previous relationship has been removed. Manager 102 can get an updated list of relationships by using the Relationships attribute in the Managed Object Discovery Interface as described herein.

With regard to Status values included in the embodiment of Managed Object Interface Collection 200 shown in FIG. 2, Operational status can indicate the underlying resource is operational and ready to process incoming messages. Failed status can indicate managed object 108 has detected a problem and the underlying resource is unable to process incoming messages. Inactive status can indicate underlying resource has terminated normally. Unknown status can indicate the state of the underlying resource is unknown.

Figure 3:
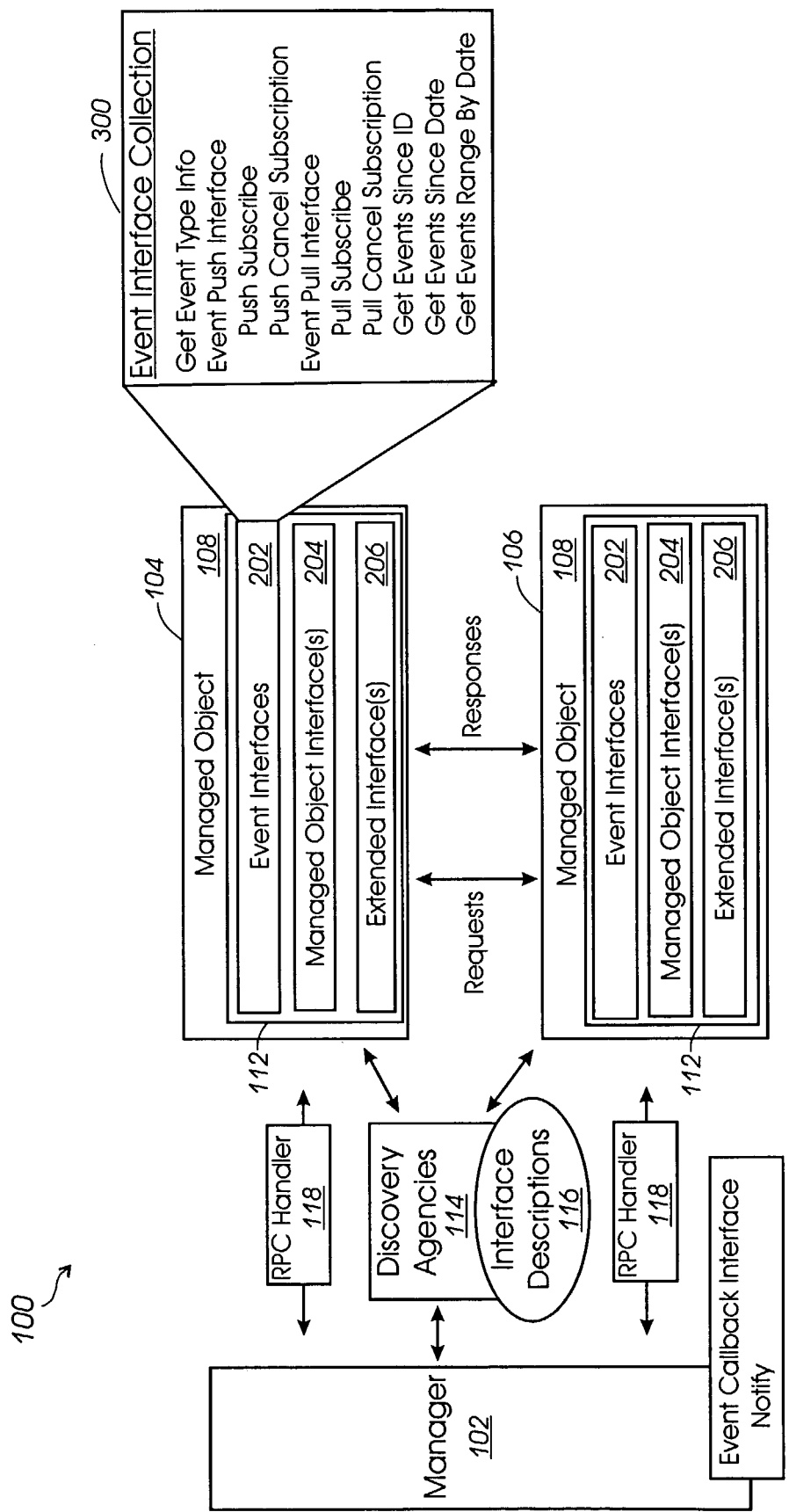
FIG. 3 is a diagram showing further detail of an embodiment of another portion of the management interfaces of FIG. 1B.

Referring now to FIG. 3, management system 100 defines notification syntax and processing rules to inform one or more managers 102 that an event has occurred. An event is a state change in a managed object 108. A notification can also be used to share informational events. In some embodiments, interfaces can be used to get this information in either a push mode or a pull mode. In the push mode, managed object 108 (notifier) issues a notification to the subscribers to inform them of a change of state when an event occurs. In the pull mode, the subscriber issues calls to one or more managed objects 108 to request all the notifications that happened since the last pull call.

Management system 100 allows bulk notification operations for efficiency. For example, in the pull mode, notifications from more than one type can be retrieved through a single call. In the push mode, the subscriber can subscribe to more than one notification in one single subscribe call.

In the embodiment shown, manager 102 can subscribe to receive notification of events via one or more interfaces in Event Interface Collection 300. The embodiment of Event Interface Collection 300 shown includes a Get Event Type Info operation, Event Push Interface, Event Pull Interface, and Event Callback Interface. Managed objects 108 implement the Get Event Type Info operation, Event Push Interface and Event Pull Interface, while Event Callback Interface is implemented by subscribers, such as manager 102, to the events.

Get Event Type Info can represent an operation that returns a list of the event types supported by managed object 108. Any of these events may be subscribed to in either a push or pull mode by calling the appropriate subscribe operation as further described herein.

The embodiment of Event Push Interface shown includes Push Subscribe and Push Cancel Subscription operations. The operation Push Subscribe (EventTypes, CallbackUrl, ExpirationTime) allows manager 102 to register to receive a notification when any of a list of event types occur. In some embodiments, the return value from the Push Subscribe operation is a subscription ID.

Manager 102 can pass the subscription identifier to the Push Cancel Subscription operation to stop receiving notifications for the specified event types. The subscription can expire automatically after the expiration of a pre-specified time period. Manager 102 can invoke the Push Subscribe operation again to continue to receive event notifications.

In the embodiment of Event Pull Interface shown in FIG. 3, Pull Subscribe (EventTypes, ExpirationTime) can represent an operation that allows manager 102 to subscribe to receive notifications of specified event types as requested by Manager 102. Managed object 108 can cache events of the types specified for later retrieval using operations such as: GetEventsSinceId, GetEventsSinceDate, and GetEventsRangeByDate. Pull Subscribe returns an identifier for the subscription. Manager 102 can pass the subscription identifier to the Pull Cancel Subscription operation to stop receiving notifications for the specified event types. The subscription can expire automatically after a prespecified period of time expires, at which time the specified event types will no longer be cached for that subscription. In order to continue to receive events of this type, manager 102 can re-subscribe for the desired event types. Each implementation can specify the time period to determine when subscriptions expire and how long events are saved before they are discarded.

Pull Cancel Subscription (SubscriptionId) can represent an operation that allows manager 102 to indicate the termination of interest in event types from previously registered subscriptions. The subscription identifier passed to this operation is typically the identifier returned from a previous call to Pull Subscribe.

Get Events Since Id (SubscriptionId, EventId) can represent an operation that retrieves all events that have occurred since the event specified by the EventId. Only the events of the type specified by the previous subscription will be returned.

Get Events Since Date (SubscriptionId, Date) can represent an operation that retrieves all events that have occurred since the specified date and time. In some embodiments, only the events of the type specified by the previous subscription will be returned.

Get Events Range By Date (SubscriptionId, StartDate, EndDate) can represent an operation that retrieves all events that occurred in the specified date range. In some embodiments, the events of the type specified by the previous subscription are returned. In order to avoid missing any events, the date range can be inclusive of the endpoints.

Event Callback Interface includes Notify (notifications) operation, which can be provided by a subscriber to push events. When managed object 108 undergoes a state change that results in one or more event to which a subscriber has registered, the subscriber invokes the Notify operation with a corresponding list of notifications. A subscriber implements Event Callback Interface in order to receive the notifications.

Notifications are used in management system 100 to capture and correlate events from the Managed Objects. One or more notifications can be sent in any suitable format, such as a SOAP body. In one embodiment, the notification includes some or all of the following information:
  Source, which can be any identifier that identifies the notifier;
  Severity, which indicates a severity level for the notice;
  Type, which classifies the notifications;
  Identifier, which is a unique identifier for the notification generated;
  CorrelationId, which is used to bind a set of notifications in the same context;
  Timestamp, which is the time the notification was issued;
  Expiration, which is the time the notification will expire;
  Message, which describes the associated event; and
  CorrectiveMessage, which suggests a corrective action.

Other information can be included in a notification in addition to, or instead of, one or more of the items of information described above.

In some embodiments, management system 100 supports a request/response model between manager 102 and managed objects 108, as well as between managed objects 108. In some further embodiments, if there is an error in a request or with the processing of a request, a SOAP fault message is returned instead of the response. A SOAP fault includes a fault code, a fault string, a fault actor, and an error detail.

Extending Management Capabilities for Managed Objects

Figure 4:
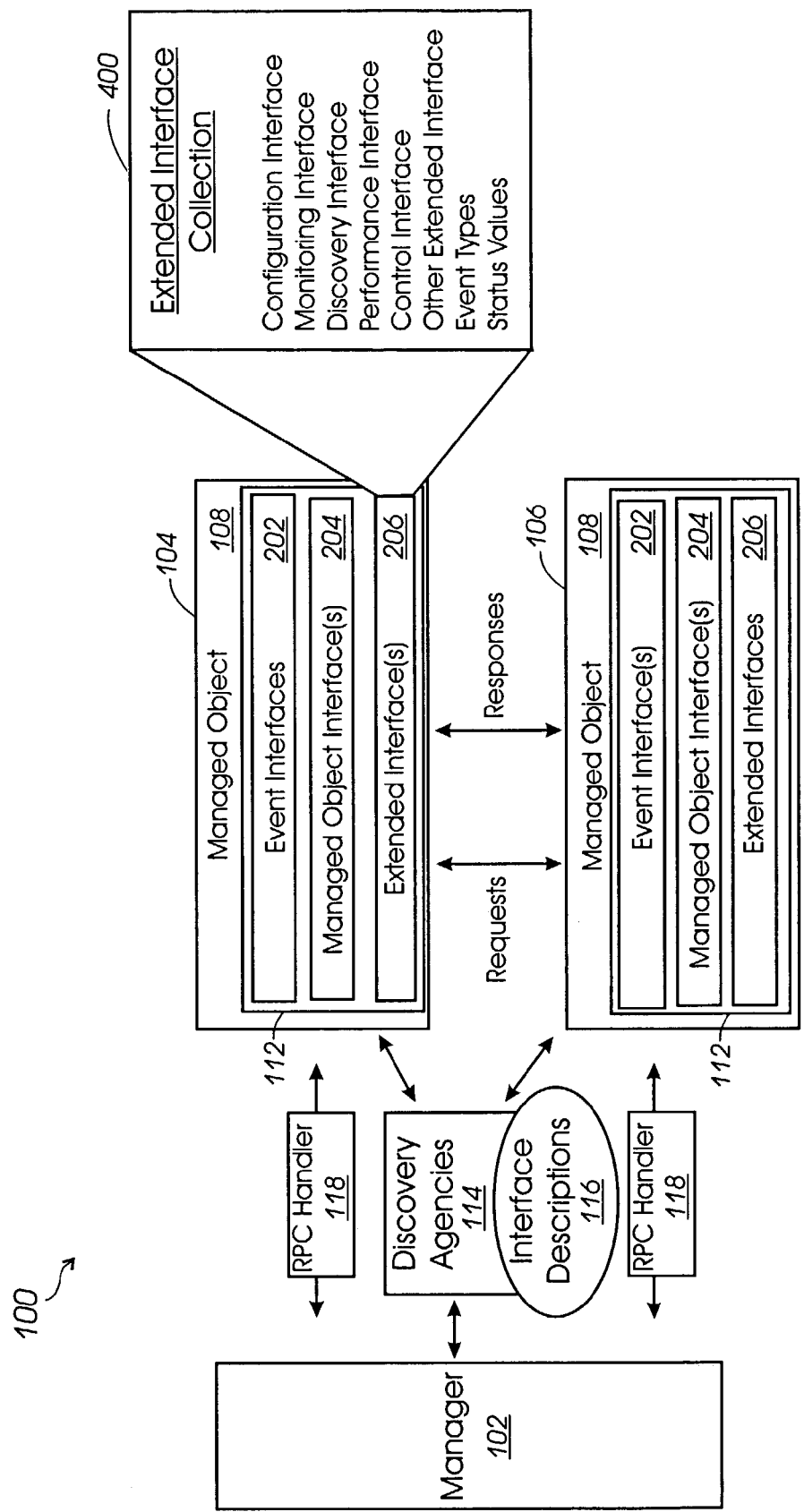
FIG. 4 is a diagram showing further detail of an embodiment of yet another portion of the management interfaces of FIG. 1B.

Referring to FIG. 4, extended interfaces 206 can be implemented to extend event interfaces 202 and managed object interfaces 204 to manage additional aspects of respective managed objects 108. In some embodiments, marker attributes for new management port types can be implemented in corresponding interface descriptions 116 to expose additional management aspects of managed objects 108.

For example, to extend resource management system 100 by defining a new relation, an identifier, such as a URI to represent the new relation and an operation to follow the relation can be created. The relation attribute to the operation can be defined to indicate that the operation corresponds to the newly defined relationship by setting the value of the attribute to the identifier, such as a URI representing the relation. For example, suppose a company defines a new relation called "like" and assigns to it the identifier "http://mycompany.com/relations/like"; the following segment describes how the Relation attribute can be used to express the fact that the "GetServicesLike" operation corresponds to the following "like" relation:

```
<myns:portType name="myPortType">
  <operation name="getServicesILike"
             relation="http://mycompany.com/relations/like">
  (...)
  </operation>
</myns:portType>
```

When an operation is marked with the Relation attribute, the operation typically returns a list of managed objects 108. The list of managed objects 108 can be the same as returned by the GetRelationships operation in managed object interface 204 with the exception of managed objects 108 that do not correspond to the relation designated by the Relation attribute. Further, other suitable programming languages or logic instructions can be utilized to implement interface descriptions 116, in addition to, or instead of, WSDL as used in the examples provided herein.

DISTRIBUTED BUSINESS PROCESSES EXAMPLE

Figure 5:
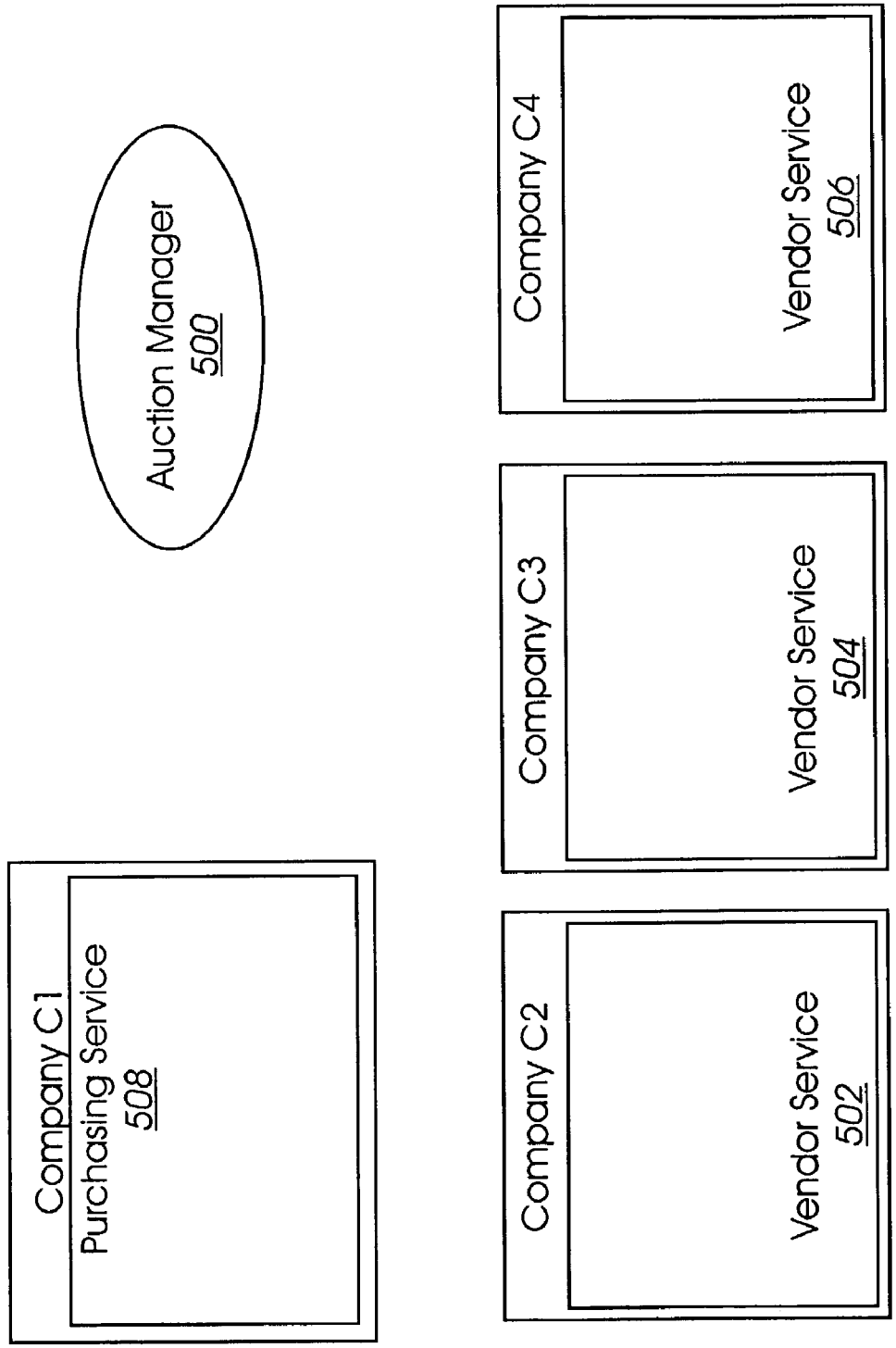
FIGS. 5 and 6 show diagrams of four independent entities capable of coordinating distributed Web services that can be monitored by a manager.
Figure 6:
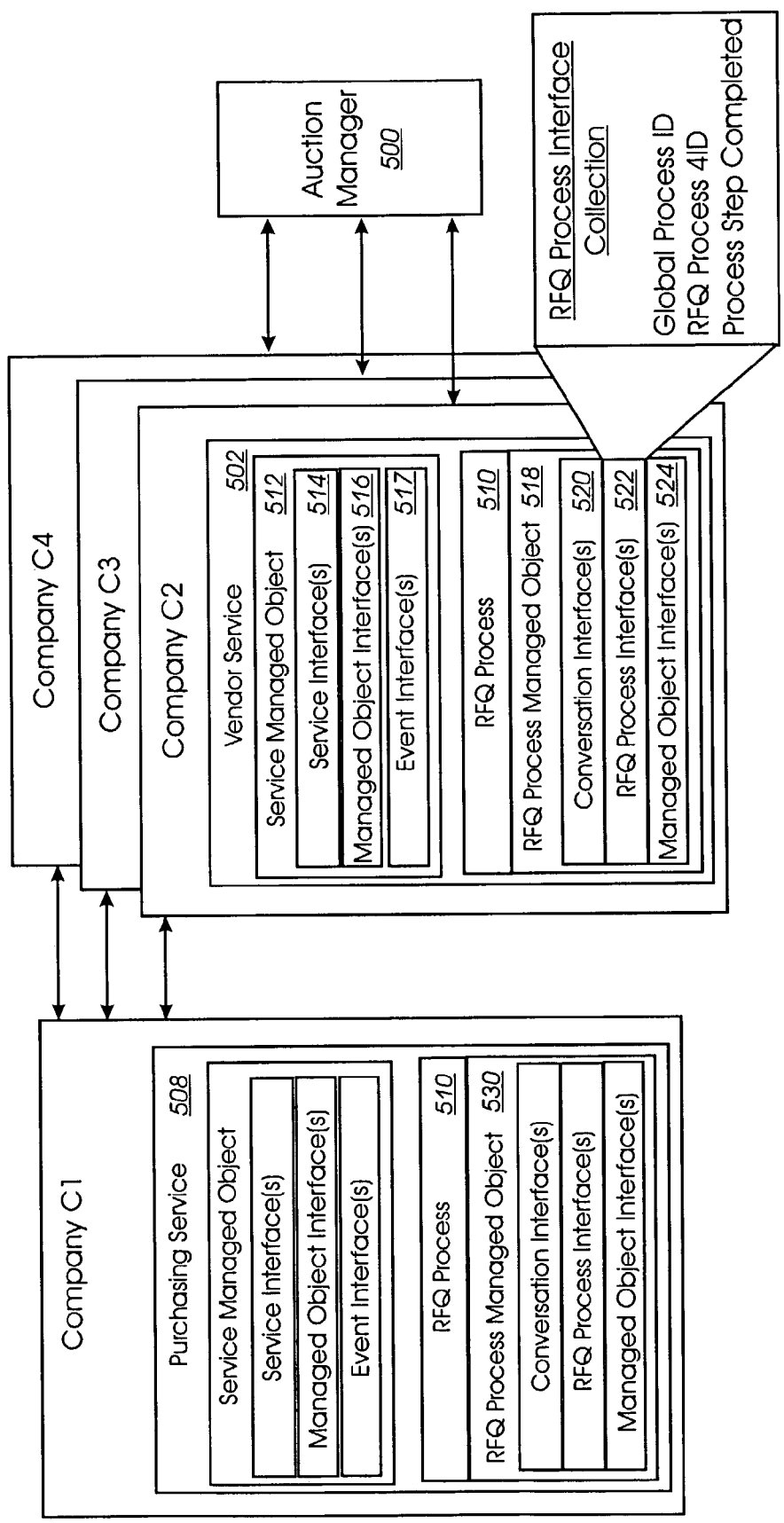

As an example of the use of management interfaces 112 (FIG. 2) to provide a common, consistent facility for accessing management features of managed objects 108 and allow manager 102 to issue a request to all, or a selected subset, of managed objects 108 via a single request, FIGS. 5 and 6 show diagrams of distributed business processes with four independent Web services that can be monitored by auction manager 500. Companies C2, C3, and C4 provide vendor services 502, 504, 506 to bid on items specified in requests for quotes (RFQs) from purchasing service 508 at Company C1. The distributed process of submitting and responding to the RFQs is shown as RFQ Process 510 in FIG. 6.

Auction manager 500 offers a management service that monitors the progress of RFQ Process 510. The business logic and operational processes are performed through purchasing service 508 at Company C1 and vendor service objects 502, 504, 506 from Companies C2, C3, and C4, respectively.

Auction manager 500 has an agreement with Companies C1, C2, C3, and C4 in which auction manager 500 defines RFQ process 510 for Company C1's purchasing service 508 to submit the RFQ, and for Companies C2, C3, and C4 to respond to the RFQ. In one embodiment, RFQ process 510 is implemented in the Business Processes Execution Language (BPEL). BPEL is an XML-based language designed to enable task sharing for a distributed computing environment, even across multiple organizations, using a combination of Web services. A developer formally describes a business process that will take place across the Web in such a way that any cooperating entity can perform one or more steps in the process the same way. In a supply chain process, for example, a BPEL program might describe a business protocol that formalizes the pieces of information in a product order, and the exceptions that may have to be handled. Other suitable specifications for implementing RFQ process 510 can be utilized, in addition to, or instead of, BPEL.

Auction manager 500 monitors RFQ process 510, which choreographs the flow of messages for the bidding until the bidding terminates. Vendor service 502, which is also representative of vendor services 504 and 506, includes service managed object 512 with service interfaces 514, managed object interfaces 516, and event interfaces 517. Vendor service 502 also includes RFQ process 510, with RFQ process managed object 518, conversation interfaces 520, RFQ process interfaces 522, and managed object interfaces 524. Managed object interfaces 524 include information regarding RFQ process 510, including the relationship of RFQ process 510 with respect to vendor service 502. Companies C2, C3, and C4 each provide auction manager 500 with a URI pointing to interface descriptions (not shown) for vendor services 502, 504, 506.

RFQ process interface 522 can be an extension to conversation interfaces 520. RFQ process 510 can therefore use attributes, operations, status values, and notifications defined in conversation interfaces 520 and managed object interfaces 524, as well as the extensions defined specifically for RFQ process 510. For purposes of this example, assume RFQ process interfaces 522 includes the following elements:

Get Global Process ID operation, which returns the global process ID (URI) for an instance of RFQ process 510. In some embodiments, the global process ID is the URI contained in the Context/Identifier element defined by WS-Coordination, which is a known framework for coordinating distributed application programs that form Web services. Other suitable identifiers can be used.

Get RFQ Process 41D operation, which returns the URI for a description of managed object interfaces 520, 522, 524 for the specific global process ID returned from the GetGlobalProcessID operation.

Process Step Completed notification, which issues an event notification to subscribing auction managers 500 when specified portions of each RFQ process 510 are completed.

Figure 7:
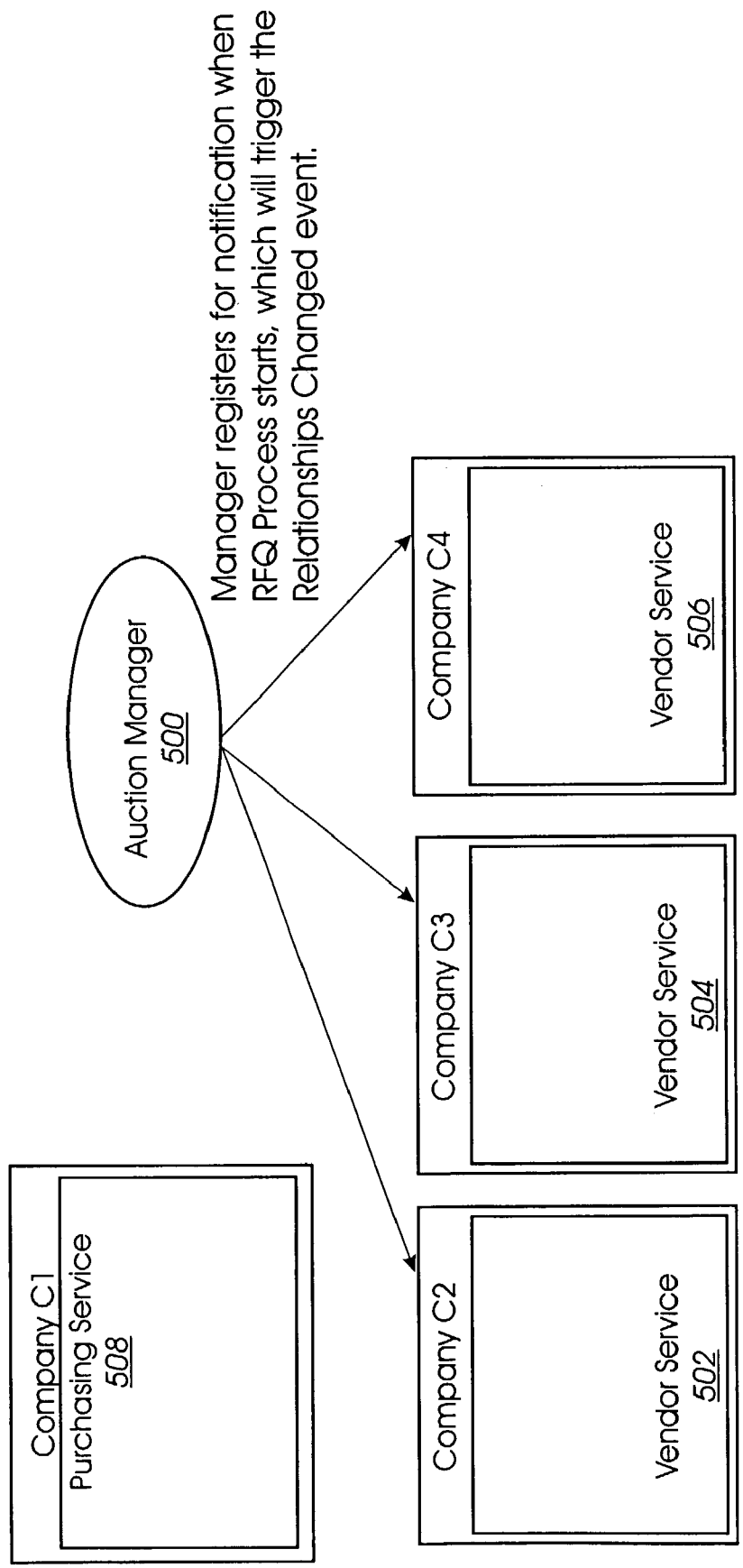
FIGS. 7 through 12 show diagrams of the distributed processing system of FIGS. 5 and 6 with annotations of various processes performed by RFQ process and auction manager.

FIGS. 7 through 12 show diagrams of the distributed services of FIGS. 5 and 6 with annotations of various processes performed throughout the bidding process. In FIG. 7, auction manager 500 uses the identifier pointing to management object interface descriptions (not shown) that were provided by vendor services 502, 504, 506. Auction manager 500 registers for notification with vendor service managed object 512 (FIG. 6) using the Relationships Changed event notification in managed object interfaces 516 (FIG. 6).

Figure 8:
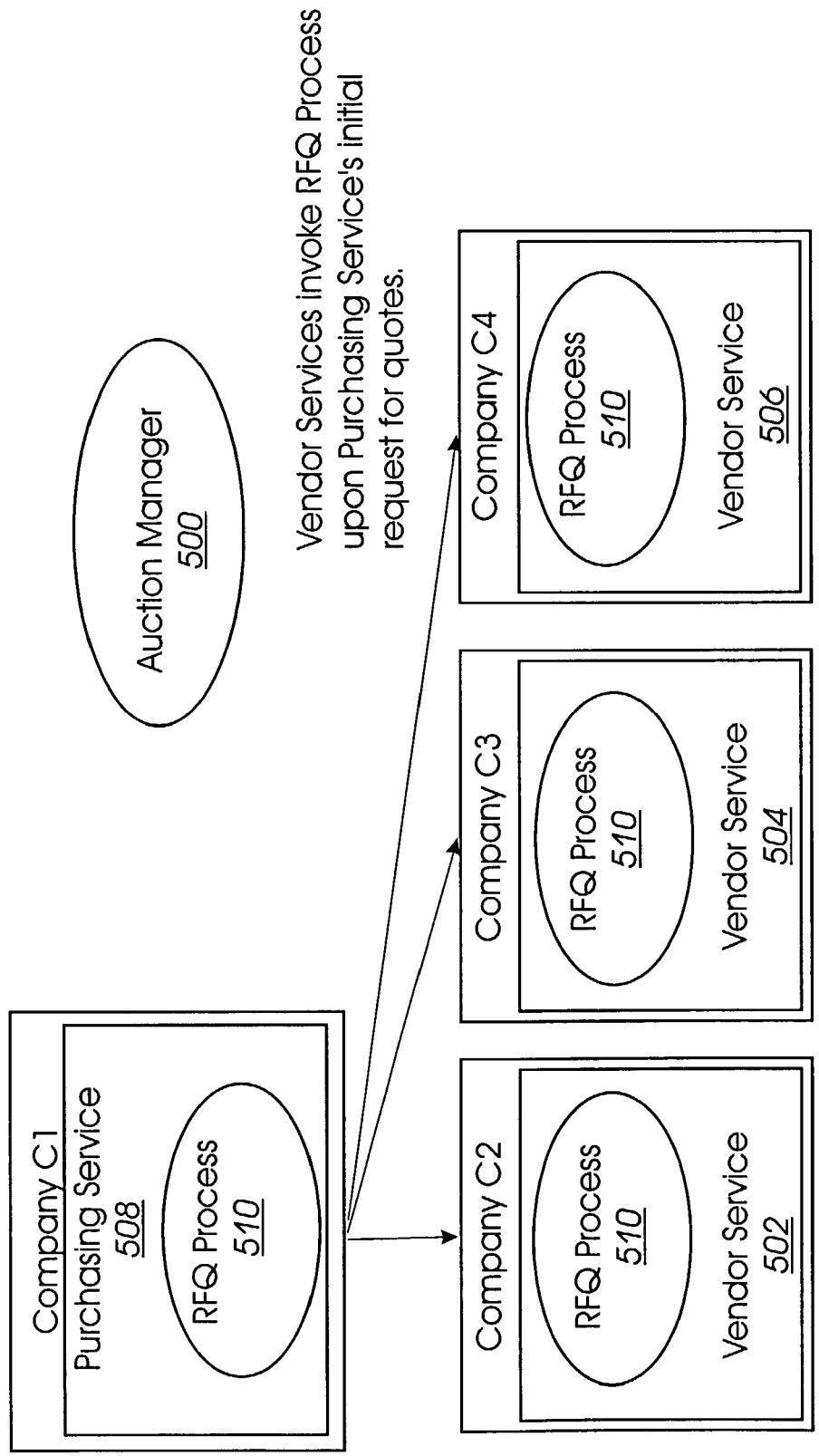

Referring to FIG. 8, purchasing service 508 knows that RFQ process 510 is available to buy selected items at a competitive price from participating vendors, such as Companies C2, C3, and C4. Purchasing service object 508 knows that auction manager 500 is available to monitor RFQ process 510, but does not necessarily know the identity of auction manager 500.

Based on the description of RFQ process 510, purchasing service 508 sends a RFQ document to vendor services 502, 504, and 506. Upon receiving the RFQ document, vendor services 502, 504, 506 invoke RFQ process 510, as shown in FIG. 8.

Figure 9:
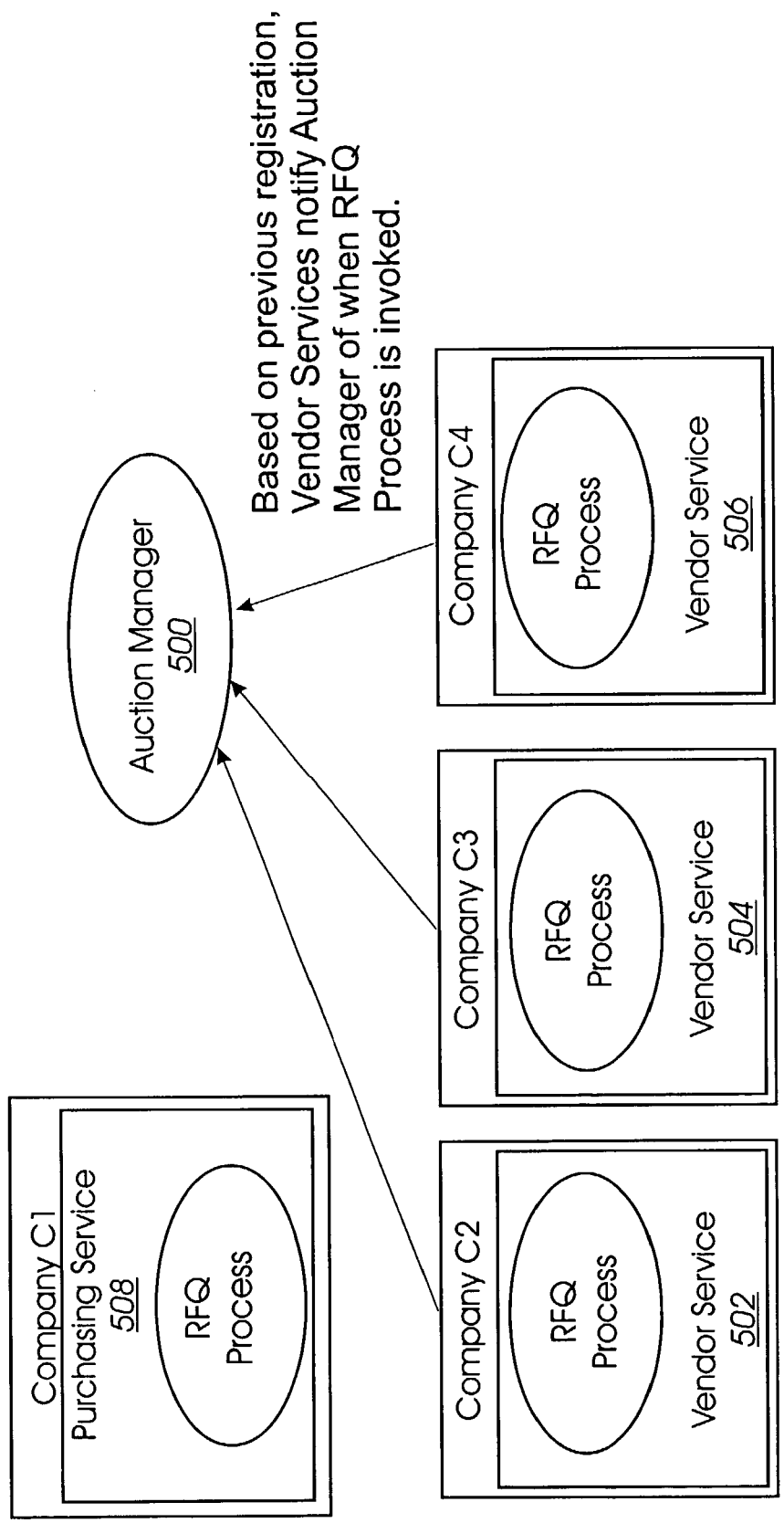

Referring to FIGS. 6 and 9, vendor services 502, 504, 506 send a notification to auction manager 500 when RFQ processes 510 begin executing. The notification includes a link to managed object interfaces 524. When the notification arrives, auction manager 500 retrieves a description of managed object interfaces 524 for RFQ process 510 using information in the notification. The interface description defines interfaces 520, 522, 524 for auction manager 500. Auction manager 500 discovers related service managed objects 512 via the Relationship attribute in managed object interfaces 524. Auction manager 500 can then invoke the management features for RFQ process 510 in RFQ process interfaces 522, as well as in managed object interfaces 524, service interfaces 514, managed object interfaces 516, and conversation interfaces 520.

Auction manager 500 can then call the Get Global Process ID operation in RFQ interfaces 522 for each RFQ process 510. The Get Global Process ID operation returns the same global ID for RFQ process 510, thus allowing the Auction Manager 500 to logically represent the separate instances of RFQ process 510 as the same process. In some embodiments, auction manager 500 utilizes bulk operations such as the Get, Set, and Invoke Operations in Managed Object Interface Collection 200 (FIG. 2) to streamline the process of issuing requests to each instance RFQ Process 510. For example, auction manager 500 can use the Invoke Operation in Managed Object Interface Collection 200 (FIG. 2) to invoke the Get Global Process ID operation on each instance of RFQ Process 510. The bulk operations can be invoked on managed object, such as RFQ Process Managed Object 518. RFQ Process Managed Object 518 then issues the request to all managed objects, also referred to as members, specified in the bulk request.

Figure 10:
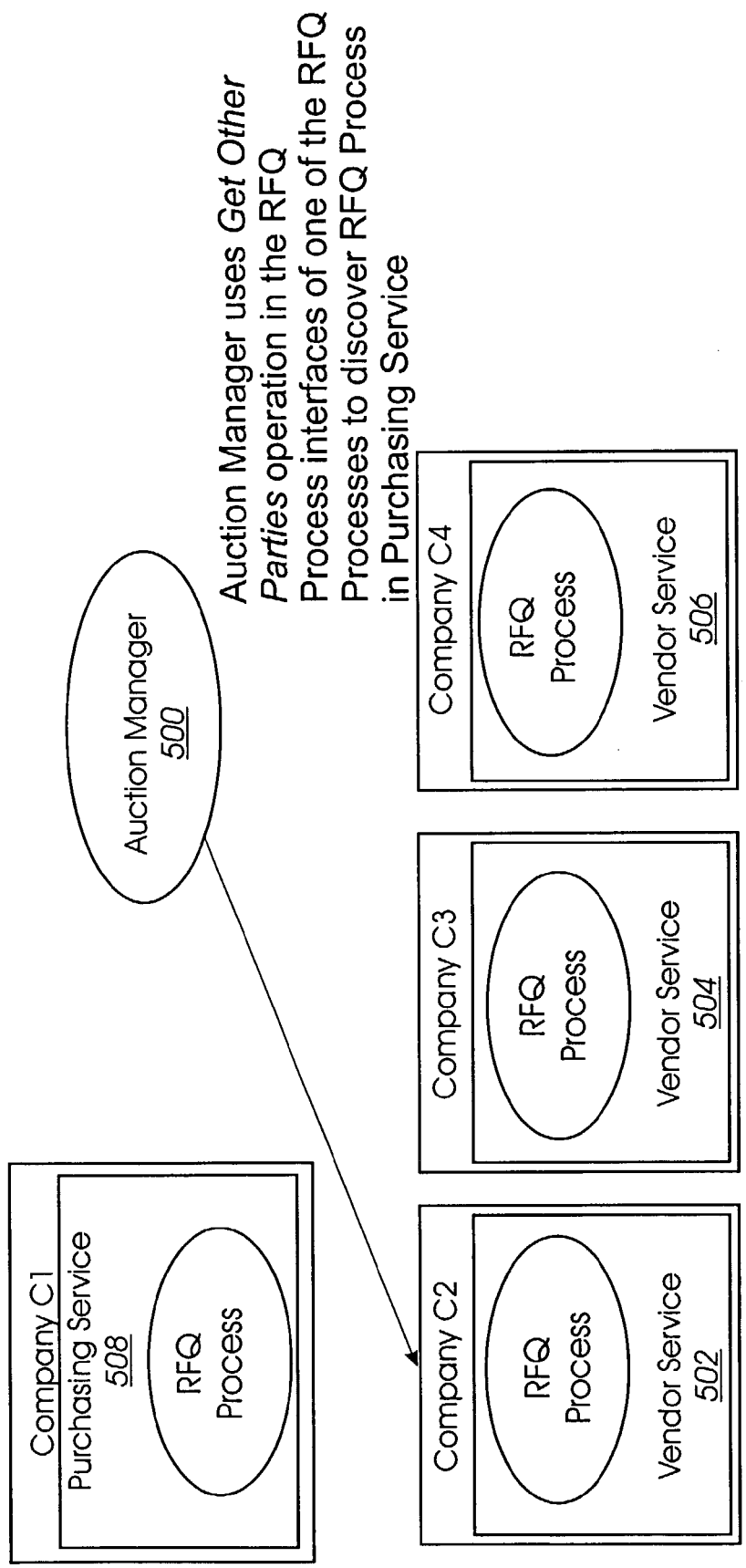

Referring to FIGS. 6 and 10, auction manager 500 invokes the Get Other Parties operation in conversation interfaces 520 for one of the three vendor companies. The Get Other Parties operation returns the identification for the three vendor services 502, 504, 506, plus purchasing service 508. Using this information, auction manager 500 retrieves a description of managed object interfaces 516 for vendor service object 502. Auction manager 500 then invokes the Get RFQ Process 4ID operation in RFQ process interfaces 522, passing the global process ID provided by the vendors C2, C3, C4. The Get RFQ Process 41D operation returns a link to RFQ process managed object 530 for purchasing service 508 to auction manager 500.

In situations where the vendors are not aware of each other, auction manager 500 can call the Get Other Parties operation in RFQ process managed object 518, which returns IDs for each vendor service 502, 504, 506. Auction manager 500 can then call the Get RFQ Process 41D operation in RFQ process interfaces 522 to retrieve all managed object interfaces 524 for each vendor service 502, 504, 506. In some embodiments, auction manager 500 utilizes the Invoke Operation to invoke the Get Other Parties and Get RFQ Process 4ID operations in each instance of RFQ Process 510.

At this point, discovery is complete and auction manager 500 has discovered vendor service managed objects 512 and RFQ process managed object 518 for vendor services 502, 504, 506.

Figure 11:
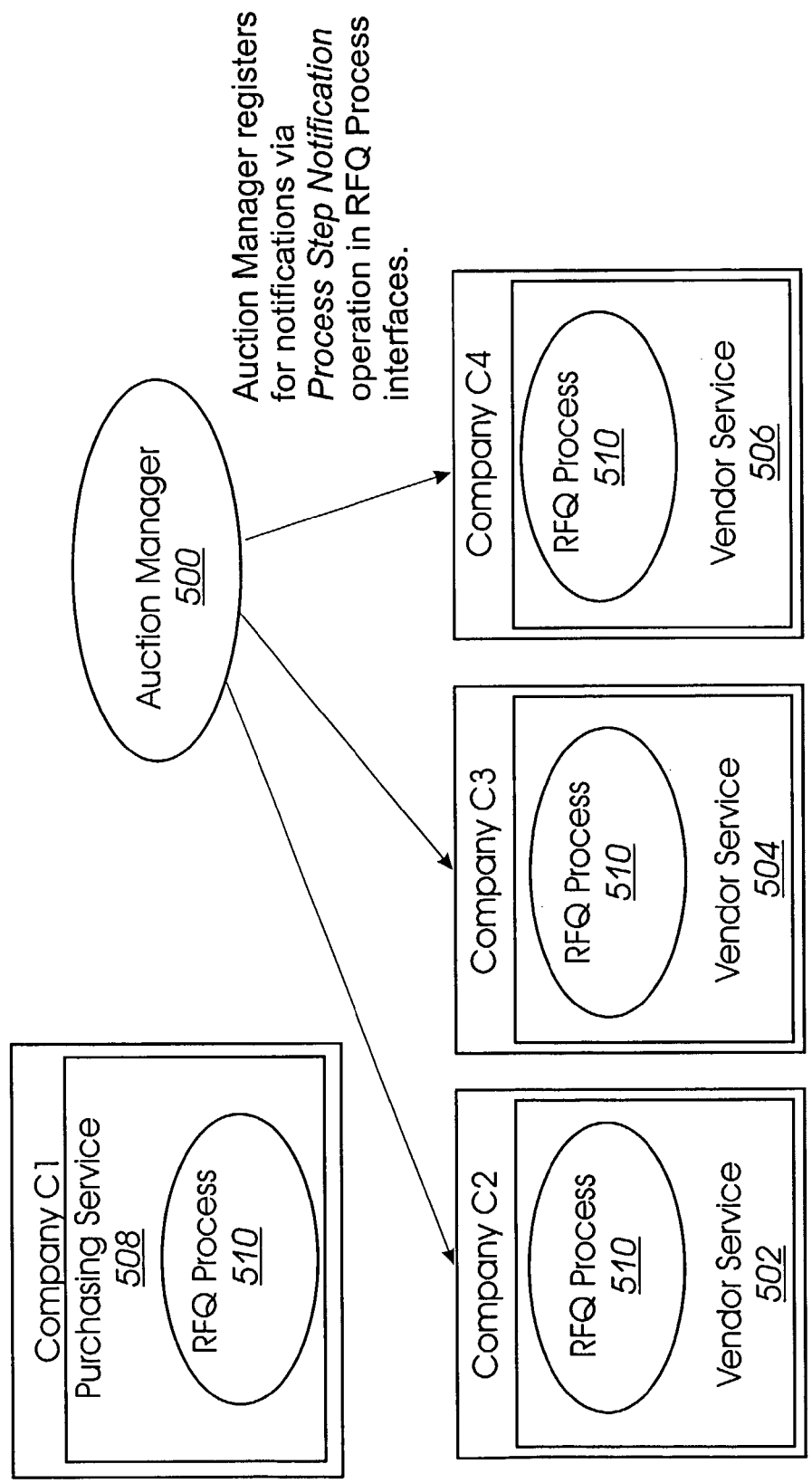

Auction manager 500 then uses the Process Step Completed notification in RFQ process interfaces 522 to register for notification every time a new step is completed, as shown in FIG. 11. In this manner, auction manager 500 can monitor the progress of RFQ process 510. In some embodiments, auction manager 500 utilizes the Invoke Operation in managed object interfaces 524 to invoke the Process Step Completed operations in each instance of RFQ Process 510 with one request.

Figure 12:
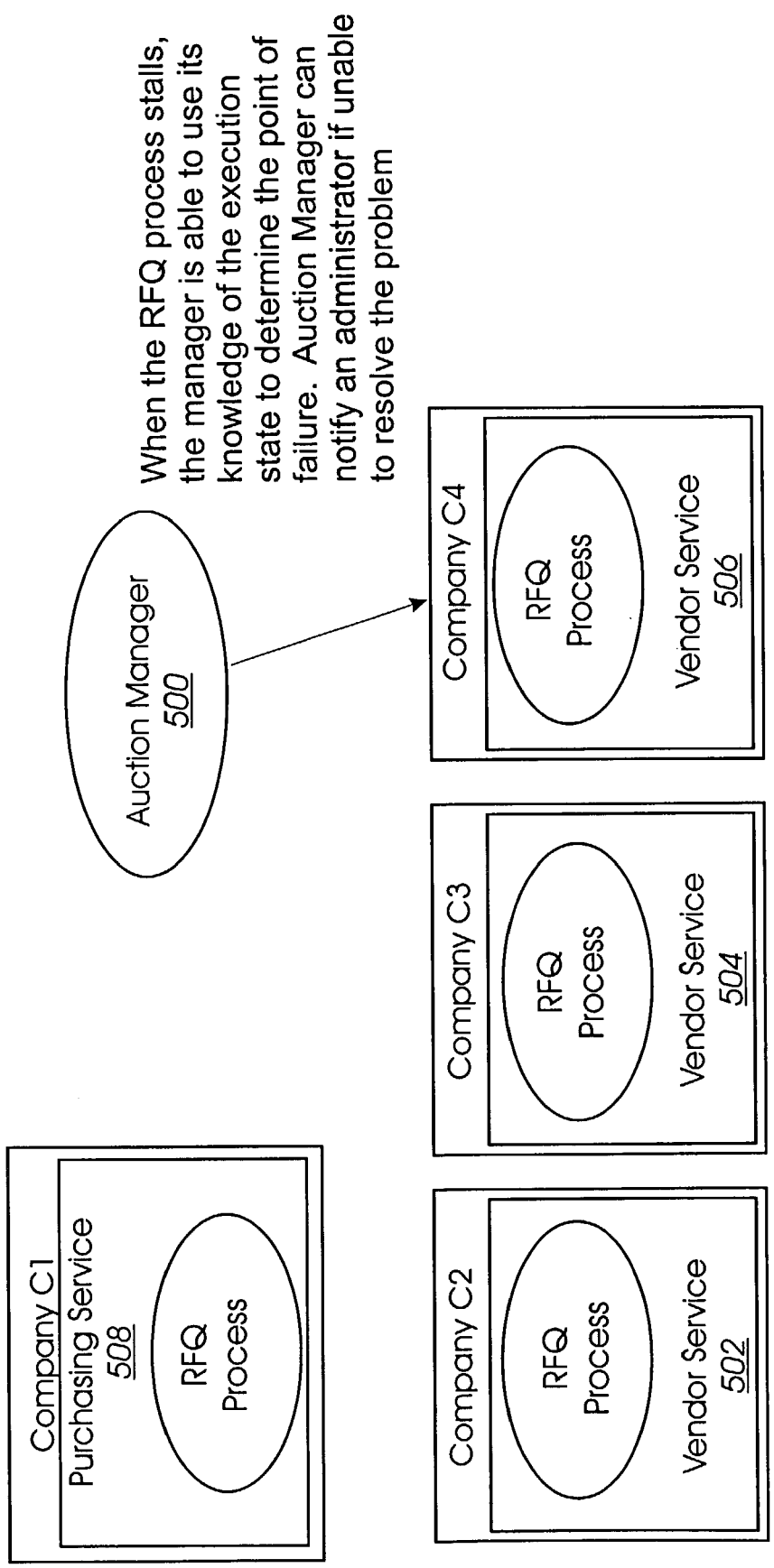

The Process Step Completed notification in RFQ process interfaces 522 continuously updates auction manager 500 as each step in RFQ process 510 is completed for each vendor service 502, 504, 506. Referring to FIG. 12, if RFQ process 510 stalls because, for example, vendor service 506 is not sending a message that is expected, auction manager 500 can determine the cause of the problem using managed object interface 524 for vendor service 506. Auction manager 500 sends a Status request to vendor service 506. When vendor service 506 does not reply within a prespecified time, the problem can be reported to a human operator at auction manager 500. The operator can contact an operator at Company C4 to solve the problem. The transaction can be completed once Company C4 fixes the technical problem.

In summary, the example of a distributed business process described above uses operations and notifications defined in the Conversation and ManagedObject interface, as the RFQ Process interface collection extends them. Company C2 provided an identifier to the interface description of its management interfaces to auction manager 500. Auction manager 500 then had access to the operational interface description for vendor services 504, 506, from which auction manager 500 discovered the management interfaces for vendor services 504, 506. After introspecting vendor service's 504 operational interface description, auction manager 500 looked for the management interface marker attribute on elements in the interface description. Once auction manager 500 discovers the marker attribute(s) on elements, auction manager 500 extracts the corresponding elements as a management interface for vendor service 504. The operational interface description for vendor service 504 did not contain any include or import statement other than those used to pull in the defined interfaces. If the operational interface description for vendor service 506 contained an import statement with the marker attribute rather then elements marked by the marker attribute, auction manager 500 can dereference the identifier provided by the location attribute of the import statement. Auction manager 500 can then discover elements that import management interfaces (and extensions to manage RFQ Process 510) that consitute the management interfaces for vendor service 506.

Referring again to FIG. 2, any type of IT resource can be configured with managed object 108, managed object interfaces 204, event interfaces 202, as well as one or more extended interfaces 206 to allow manager 102 to access management features for the underlying resource(s). While event interfaces 202 and managed object interfaces 204 provide access to a common set of management features that are selectively available for any type of resource based on the access rights of manager 102, extended interfaces 206 can be implemented to provide manager 102 with selective access to any additional management features available for the resource. Further, managed objects 108 can provide a common framework for managing resources both internal and external to an enterprise, and across domains 104, 106.

The types, operations, and attributes disclosed herein are examples of features that can be included in management interfaces 112. Other features can be implemented for management interfaces 112 in addition to, or instead of, the examples of features disclosed herein. Further, the names for the interfaces, attributes, events, operations and other interface features disclosed herein are provided for purposes of illustration only. The same names can be used to represent different features, and other names can be implemented to represent features disclosed herein.

Management interfaces 112 can be implemented within managed objects 108, such as shown for managed object 108 in FIG. 2, or in a layer external to managed object 108 as shown in FIG. 11B. Similarly, managed objects 108 can be implemented internally and/or externally to the resources they represent. Managed objects 108 interface with the underlying resources to gather information to populate data fields in management interfaces 112 that are available to manager 102. Further, managed objects 108 receive information and control parameters from manager 102 via management interfaces 112.

Components included in manager 102, discovery agencies 114, and managed objects 108 are typically implemented in computer processing systems 214 through 220, respectively. Processing systems 214 through 220 can be any suitable computer-processing device that includes memory for storing and executing logic instructions, and is capable of interfacing with other processing systems. In some embodiments, processing systems 214 through 220 can also communicate with other external components via network (not shown). Various input/output devices, such as keyboard and mouse (not shown), can be included to allow a user to interact with components internal and external to processing systems 214 through 220.

Additionally, processing systems 214 through 220 can be embodied in any suitable computing device, and so include personal data assistants (PDAs), telephones with display areas, network appliances, desktops, laptops, X-window terminals, or other such computing devices. Processing systems 214 through 220 and corresponding logic instructions can be implemented using any suitable combination of hardware, software, and/or firmware, such as microprocessors, Field Programmable Gate Arrays (FPGAs), Application Specific Integrated Circuit (ASICs), or other suitable devices.

Logic instructions executed by processing systems 214 through 220 can be stored on a computer readable medium, or accessed by processing systems 214 through 220 in the form of electronic signals. Processing systems 214 through 220 can be configured to interface with each other, and to connect to external network via suitable communication links such as any one or combination of Ti, ISDN, cable line, a wireless connection through a cellular or satellite network, or a local data transport system such as Ethernet or token ring over a local area network.

The Hypertext Transfer Protocol/Secure (HTTPS) is a suitable communication protocol when integrity and/or confidentiality of the SOAP messages is required. When end-to-end security of the SOAP payload is required, WS-Security or other communication protocols may be used. Manager 102 can also authenticate itself to managed objects 108 and vice-versa. Mutual authentication features of HTTPS or other suitable authentication methods can be used.

The logic modules, processing systems, and circuitry described herein may be implemented using any suitable combination of hardware, software, and/or firmware, such as Field Programmable Gate Arrays (FPGAs), Application Specific Integrated Circuit (ASICs), or other suitable devices. The logic modules can be independently implemented or included in one of the other system components. Similarly, other components have been discussed as separate and discrete components. These components may, however, be combined to form larger or different software modules, logic modules, integrated circuits, or electrical assemblies, if desired.

While the invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps necessary to provide the structures and methods disclosed herein, and will understand that the components and their arrangement are given by way of example only. The configurations can be varied to achieve the desired structure as well as modifications, which are within the scope of the invention. Variations and modifications of the embodiments disclosed herein may be made based on the description set forth herein, without departing from the scope of the invention as set forth in the following claims. In the claims, unless otherwise indicated the article "a" is to refer to "one or more than one".

We claim:

1. A system for managing a number of information technology (IT) resources, comprising:
logic instructions on non-transitory computer readable media including:
a number of managed objects that represent at least one of the number of resources;
a number of management interfaces, including an event interface, a managed object interface, and an extended object interface, associated with the number of managed objects, wherein the number of management interfaces are configured with at least one component that represents a management feature for at least one of the number of resources; and
an attribute associated with the at least one component in the management interfaces, wherein the attribute indicates the presence of the management feature to a manager, and the attribute provides a list of other management interfaces related to at least one of the number of management interfaces;
wherein the number of management interfaces can operate independently of a user interface for managing the number of resources; and
wherein the number of management interfaces can derive at least one component from the managed objects and establish relationships between managed objects based on information provided by the managed objects.

2. The system of claim 1, wherein at least one of the number of management interfaces includes a component that allows the manager to discover a description of the at least one management interface.

3. The system of claim 2, wherein the description describes other management interfaces related to at least one of the number of management interfaces.

4. The system of claim 2, wherein the description is implemented in WSDL.

5. The system of claim 2, wherein the description can be accessed by the manager via a discovery agency.

6. The system of claim 1, wherein at least one of the number of management interfaces includes a component that allows the manager to discover other managed objects that are related to the number of managed objects.

7. The system of claim 1, wherein at least one of the number of management interfaces includes a component that allows the manager to discover other managed objects that have a specified relation to the number of managed objects.

8. The system of claim 1, wherein the at least one of the number of management interfaces includes a component that allows the manager to discover relationships supported by the at least one management interface.

9. The system of claim 1, wherein the at least one component that represents the management feature for the resource is a port type.

10. The system of claim 1, wherein the at least one component that represents the management feature for the resource is a message.

11. The system of claim 1, wherein the at least one component that represents the management feature for the resource is an operation.

12. The system of claim 1, wherein at least one of the number of management interfaces exposes different features of the managed object to different managers.

* * * * *

UNITED STATES PATENT AND TRADEMARK OFFICE
CERTIFICATE OF CORRECTION

PATENT NO. : 7,984,128 B2
APPLICATION NO. : 10/445236
DATED : July 19, 2011
INVENTOR(S) : Vambenepe et al.

It is certified that error appears in the above-identified patent and that said Letters Patent is hereby corrected as shown below:

In column 18, line 50, in Claim 8, after "wherein" delete "the".

Signed and Sealed this
Tenth Day of April, 2012

David J. Kappos
*Director of the United States Patent and Trademark Office*